United States Patent [19]
Babbitt

[11] 3,791,020
[45] Feb. 12, 1974

[54] INVERTED TUBE MILL METHOD

[75] Inventor: Charles A. Babbitt, Palos Verdes Estates, Calif.

[73] Assignees: Torrance Machinery & Engineering, Torrance; Babbitt Engineering & Machinery, Inc., Palos Verdes Estates, both of, Calif.

[22] Filed: Sept. 7, 1971

[21] Appl. No.: 178,472

Related U.S. Application Data
[63] Continuation of Ser. No. 758,978, Sept. 11, 1968, abandoned.

[52] U.S. Cl. ............... 29/477.7, 29/429, 29/477, 228/5, 228/15, 228/17
[51] Int. Cl. ............................................. B23k 31/02
[58] Field of Search 29/33 D, 429, 430, 477, 477.7; 219/6, 62; 228/5, 15, 17, 31; 113/116

[56] References Cited
UNITED STATES PATENTS

| | | | |
|---|---|---|---|
| 3,605,249 | 9/1971 | Kutcher et al. | 29/429 |
| 3,207,408 | 9/1965 | Thome et al. | 228/29 |
| 2,575,381 | 11/1951 | Colby | 219/6 |
| 2,563,214 | 8/1951 | Croson | 78/88 |
| 1,019,299 | 3/1912 | Buchenberg | 219/65 |
| 3,139,053 | 6/1964 | Hiroumi | 228/17 X |

*Primary Examiner*—J. Spencer Overholser
*Assistant Examiner*—Robert J. Craig
*Attorney, Agent, or Firm*—George J. Netter, Esq.

[57] ABSTRACT

A plurality of metal sheets disposed on a roller conveyor in end-to-end relation are tack welded to form a continuous sheet. The continuous sheet is passed through a series of forming rolls by which it is progressively formed into a tube with abutting side edges lying in a straight line along the underside of the tube. These side edges are seam welded on the inside of the tube, after which the individual sheets (now in tube form) are separated from one another and removed from the conveyor. Each tube is again seam welded, this time along the outside of the tube.

5 Claims, 12 Drawing Figures

INVENTOR.
CHARLES A. BABBITT
BY KENDRICK and SUBKOW
George J. Netter
ATTORNEYS

INVENTOR.
CHARLES A. BABBITT
BY KENDRICK and SUBKOW
ATTORNEYS

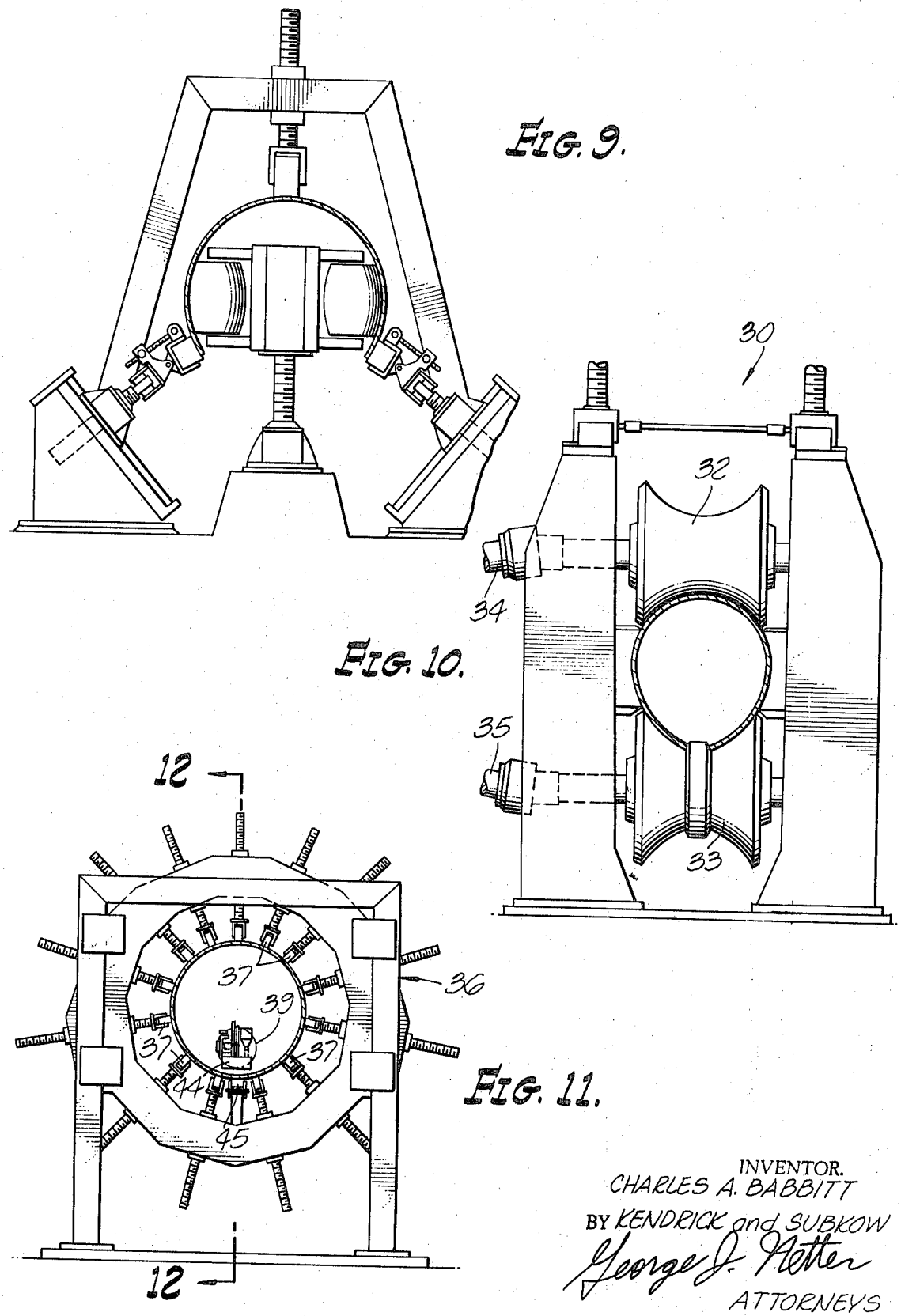

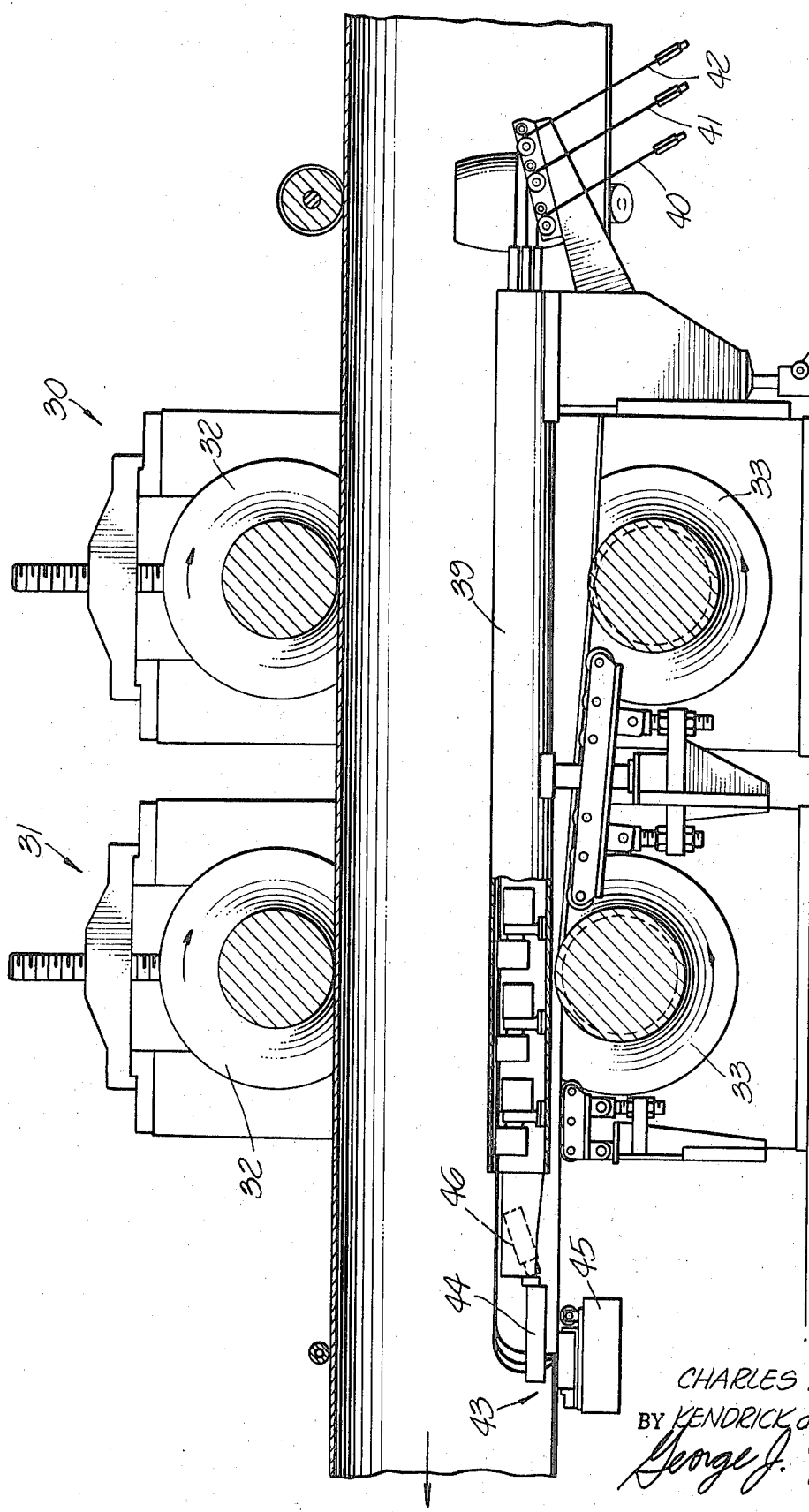

INVERTED TUBE MILL METHOD

This is a continuation of application Ser. No. 758,978, filed Sept. 11, 1968 now abandoned.

The present invention relates generally to the forming of metal tubes, and, more particularly, to method and apparatus for progressively forming flat strips of metal into cylindrical shape and welding the edges of the strip together.

BACKGROUND OF THE INVENTION

It has been conventional commercial practice to move a metallic sheet or skelp along a definite path and engage the edges thereof by a series of rollers which are designed to progressively move the edges toward one another and form a generally cylindrical tube. The opposed edges are then welded to form a seam and thereby produce a completed tube.

Heretofore, it has been common practice in the manufacturing of tubes from flat material to pass the sheet progressively through forming rolls that repeatedly work the edges tending to warp and buckle the edges. The result of such repeated working of the edges to be sealed to one another provides edges which do not mate well together for welding and require further processing in order to provide a good seal.

It has been further customary practice to generally form the sheet stock edges in an upward direction, providing in the final phases of manufacture a pair of adjoining sheet edges which are welded along a line on the upper side of the finished tube. To change the location of the forming rolls in apparatus for accomplishing this type of tube forming for tubes of different diameter is a relatively complex and difficult operation. Also, maintaining the line of weld at the upper portion of the recently formed tube requires that the tube be welded along the outside first, and then finish welding along the inner seam. Welding the internal seam of a partially finished pipe is a difficult and expensive undertaking, requiring special welding equipment which can be received within the tube interior and suitably controlled to produce the weld along the desired line.

OBJECTS AND SUMMARY

It is, therefore, a primary aim and object of the present invention to provide method and apparatus for forming flat metal stock into a tube having a straight line seam weld.

Another object of the invention is to provide method and apparatus for forming a tube from flat metal stock during which the edges to be sealed to one another are maintained in a substantially unbuckled or crimped condition.

A further object is to provide method and apparatus for forming tubes not requiring internal welding of an already externally welded tube Yet another object is the provision of method and apparatus for forming tubes which can be readily modified to produce tubes of different diameters.

A still further object is the provision of method and apparatus for manufacturing tubes from flat stock, permitting internal seam welding to be accomplished first, and finish welding to be performed on the tube outer surface.

The above objects and advantages of this invention are achieved by tack welding a plurality of rectangular sheets of flat metal stock end-to-end, forming a continuous sheet. The edges of the so formed sheet are trimmed and beveled. The continuous sheet is then passed through progressive forming rollers which exert pressure on the sheet transversely thereof to produce a cylindrical tube. The application of forming forces is from the underneath and outwardly while retaining the upper side margins so that the sheet is formed with abutting side edges displosed in a straight line on the tube underside. An internal weld is applied along the pipe interior to seal the edges to one another. The so-formed tube or pipe is conveyed along its long dimension outwardly of the internal welding station, and the tack welds are cut, leaving a section of a pipe which is welded internally. The tube is then removed to a second welding station, where a final weld is provided on the outer surface along the same seam that was welded internally. Edging and trimming and other operations now place the tube in final condition for shipment.

Other objects and advantages of the present invention will be apparent to those skilled in the art upon reference to the following description, when taken in conjunction with the accompanying drawing.

DESCRIPTION OF THE DRAWINGS

FIGS. 6–10 are elevational sectional views illustrating progressive deformation by rollers of the flat sheet to the cylindrical form.

FIG. 11 illustrates in sectional, elevational view a completely formed pipe showing the application of an internal seal to the abutting edges, taken along the line 11—11 of FIG. 1.

FIG. 12 is a side elevational, sectional view taken along the line 12—12 of FIG. 11, illustrating the pipe in final formed condition during internal welding.

DESCRIPTION OF A PREFERRED EMBODIMENT

Figure 1:
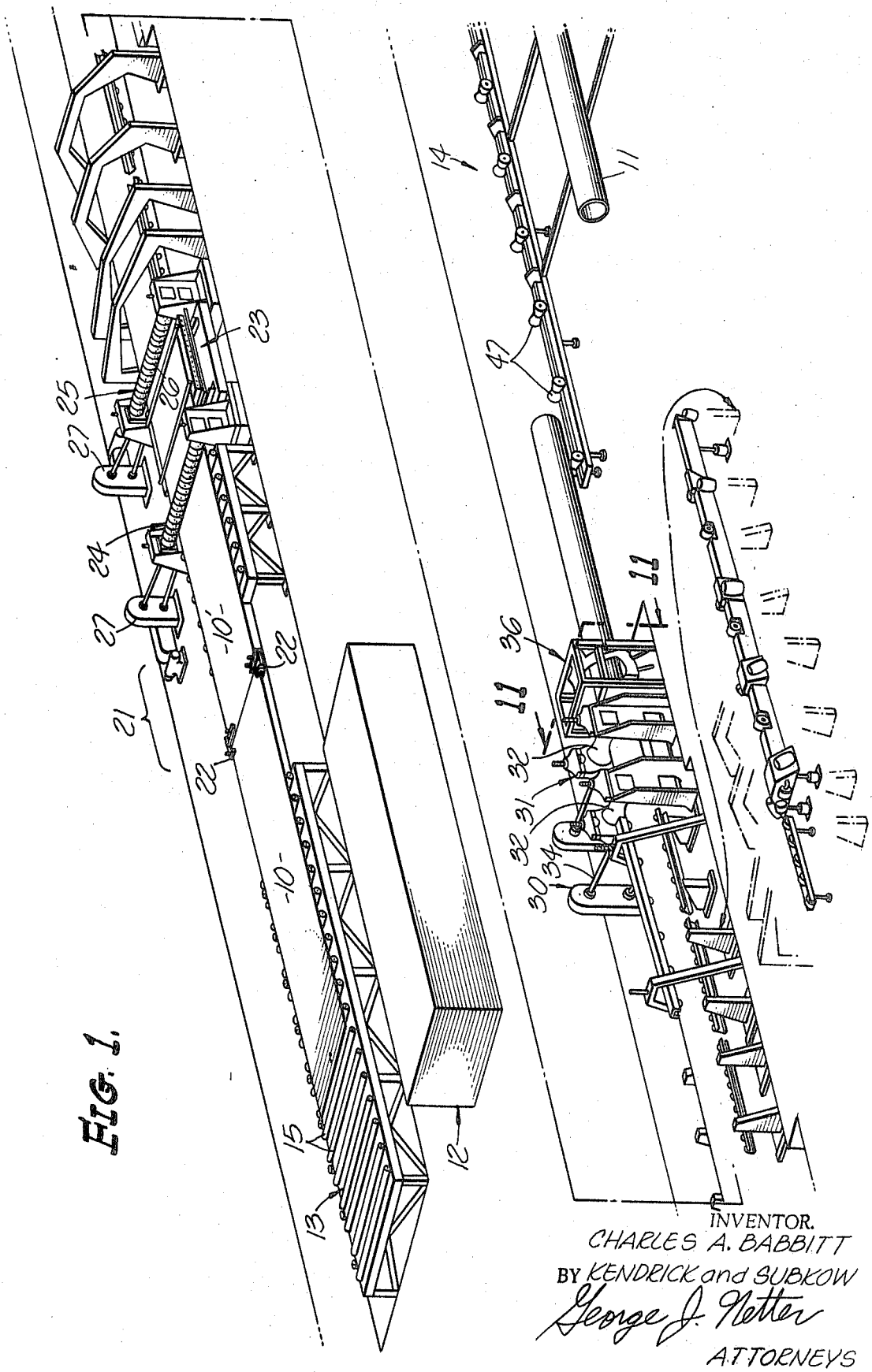
FIG. 1 is an elevational view, partially broken away, showing the forming mill of the present invention.

Turning now to FIG. 1, there is shown a tube mill in accordance with the practice of the present invention for converting elongated rectangular sheets of metal stock 10 through progressive deformation into cylindrical tube or pipe 11. The sheets 10 are individually transferred from a stack 12, located adjacent the tube mill, onto a roller conveyor 13 by means of a vacuum lift, for example, (not shown). In a way that will be more particularly described herein, successively adjacent sheets 10 are tack welded to one another and then driven through the mill where the center portions are progressively bent upward along their long dimension to form a cylindrical shape with the lower side edges moved closely adjacent one another to form a seam which is then internally welded. Next, the tack welds are then cut and the pipe sections are removed at a rollout station 14 where they are seam-welded along the external line of weld, to forming the completed tube a pipe section.

Figure 2:
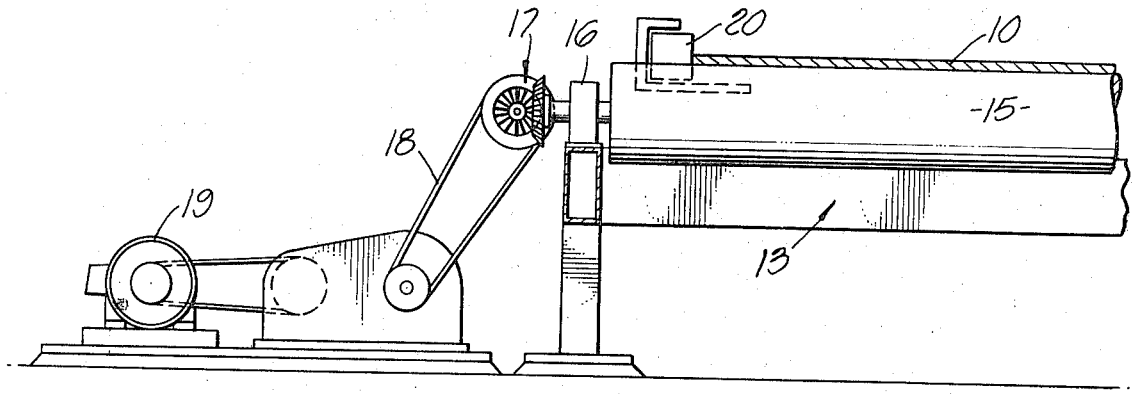
FIG. 2 is an elevational view of the plate feed table looking along the direction of plate movement.

Turning to FIG. 2, the conveyor 13 is seen to comprise a plurality of rollers 15 disposed transversely of the direction of drive desired to be imparted to the plates 10. The rollers are journaled at 16 and driven through gearing 17 and belt 18 by conventional motive power source 19. More particularly the conveyor 13 has an overspeed facility which rapidly drives newly added plates 10 forwardly along the line to catch up with plates 10' already in the mill (FIG. 1). Edge rolls 20 position the plates transversely on the conveyor with a common edge alignment.

Figure 3:
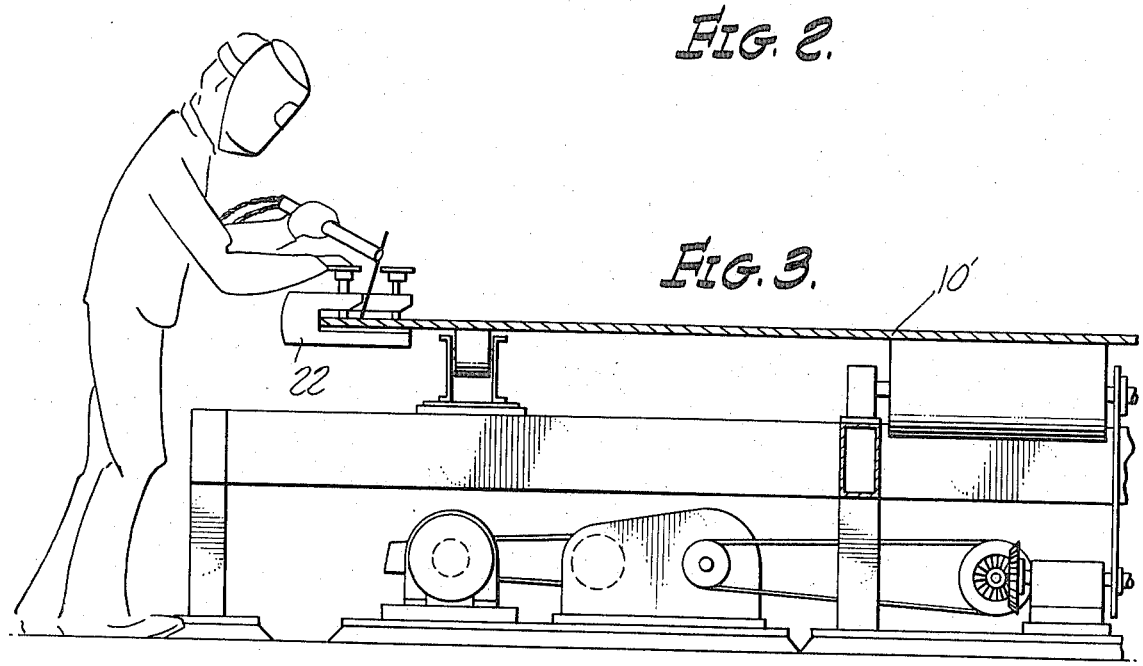
FIG. 3 is an elevational, partially sectional view of the station at which plates are spliced to one another.

In the region of the mill identified by reference numeral 21 in FIG. 1, and as particularly shown in FIG. 3, the individual plates are tack welded together. Specifically, the welder clamps a jig 22 onto the margins of a pair of adjacent plates, securing the edges thereof in abutting relation. The plates are then tack welded at both edges for a length of, say, approximately 6–8 inches, after which the jig is removed and the so-joined plates are conveyed onwardly as a continuous strip.

Figure 4:
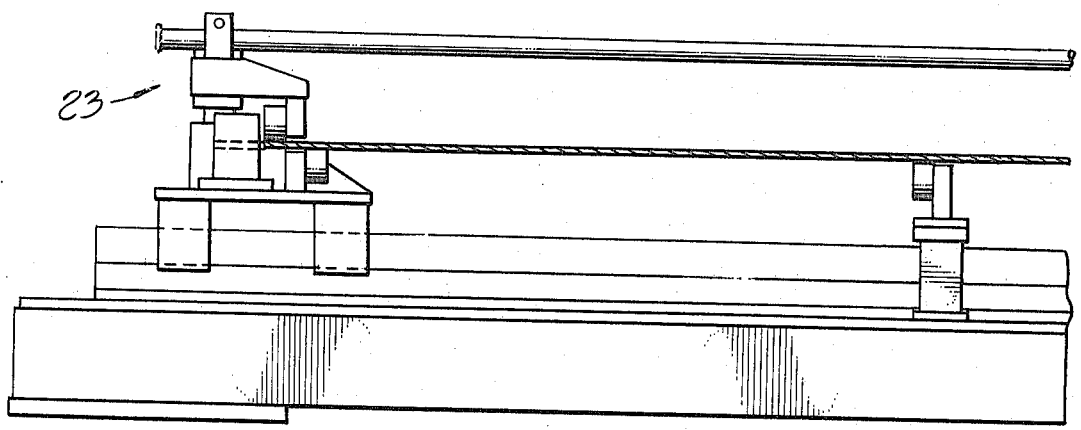
FIG. 4 is an end elevational view of that portion of the apparatus for conditioning the edges of the flat strip.

Next, as depicted in FIG. 4, the continuous sheet edges are conditioned. That is, by conventional apparatus 23, the continuous sheet is trimmed to an exact predetermined width for the particular diameter of tube or pipe being run at that time. In this manner, not only is the sheet cut to an accurate size, but also the relatively rough and uneven margins, the so-called mill edges, are removed.

The properly edged sheet is conveyed to a first powered sticker pass 24, which generally includes a plurality of tools for facing off the strip edge and beveling both the top and bottom edges. This operation is conventional, and no details are provided.

A second sticker pass 25 includes a plurality of friction drive rolls 26 for engaging the upper surface of the strip and a similar set (not shown) for drivingly engaging the lower surface of the strip along a line directly opposite the line of contact of the upper rolls. Propulsion power for the rolls is provided by conventional drive apparatus 27. It is the second sticker pass which provides the required amount of force to push the continuous strip through the inside forming mandrel to be described at this time.

Figure 5:
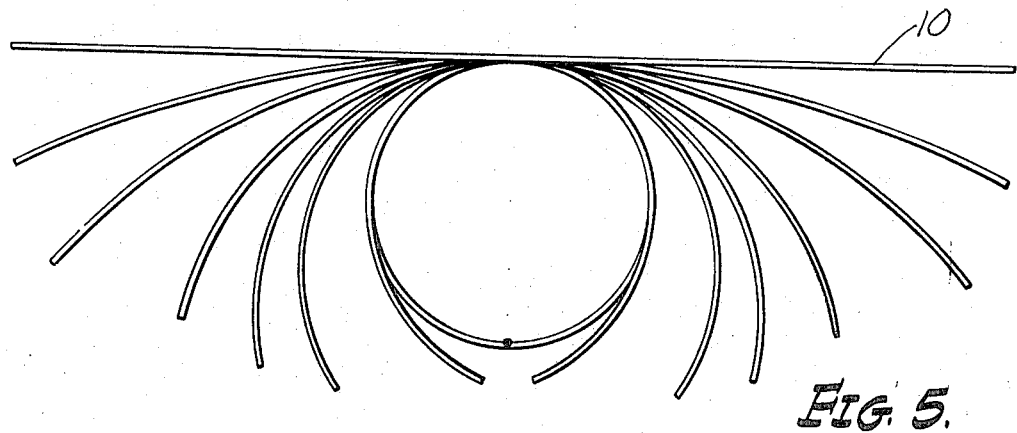
FIG. 5 is the comparative end view of the forming pipe illustrating its formed condition at various stages in the production of the final welded pipe section.
Figure 6:
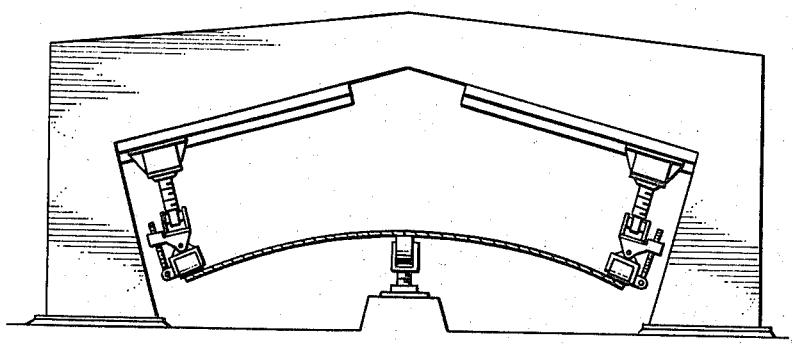

As illustrated in FIG. 5, the continuous metal sheet, on passing through the forming mill after the second sticker pass, has its central portion progressively raised while retaining the edges. In this manner, the flat sheet is brought into a final cylindrical pipe or tube form. More particularly, as shown in FIGS. 6–10, the inside mandrels are all of one-piece construction with the forming rolls facing up and out, as the case may be. This construction has improtant advantageous results when the diameter of pipe being run is desired to be changed. For example, whereas in those prior art apparatus forming a tube with a seam weld along the upper surface, changes in tube diameter required complex and relatively expensive changes in the forming mandrels, in the present mill the one-piece mandrels can be moved vertically up or down by adjustment of support jacks, e.g., jacks 28 in FIG. 7, to accommodate moderate tube diameter changes. Moreover, when the required change in tube diameter is extensive, or forming rolls have to be replaced or repaired, access to the forming rolls is a relatively easy matter.

Figure 7:
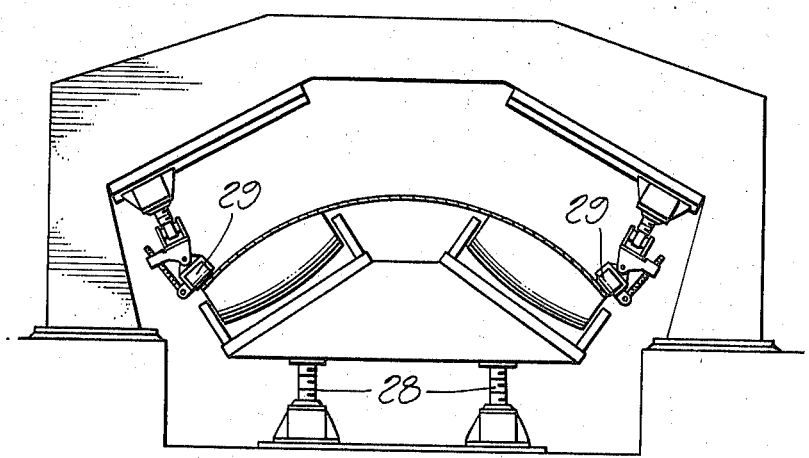
Figure 8:
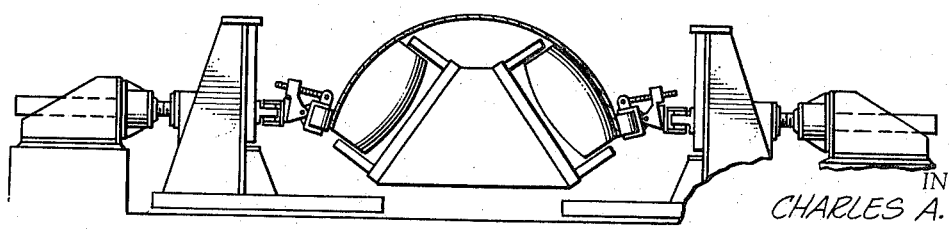

Throughout the major forming of the sheet, the upper side margins are engaged by retaining rollers, e.g., rollers 29 in FIG. 7. In addition, the sheet side edges are maintained at the same elevation above the floor on which the mill apparatus is based. Motion of the continuous sheet during forming by the internal mandrels illustrated in FIGS. 6–9 is provided entirely by drive action of the two sticker pass stations.

After forming the sheet into a high oval as in FIG. 9, the partially formed sheet now moves through two fin pass stands 30 and 31, detailed structure of which is substantially the same in each case and is as depicted in FIG. 10. Each fin pass stand is seen to comprise generally upper and lower concave forming rolls 32 and 33, respectively, which are powered via axles 34 and 35 connected to an adjacently located power source (not shown). It is in the fin pass stands that the high oval partially formed tube of FIG. 9 is shaped into the final desired cylindrical tube.

The cylindrical tube, on leaving fin pass stand 31, enters the welding cage 36. The outer surface of the cylindrical tube is engaged by a plurality of radially directed rollers 37. As will be clear after the description of the welding apparatus, the welding cage is universal and can be made to accomodate tubes of any diameter by simple adjustment of the rollers 37, or by raising and lowering the welding cage as a unit within the cage stand 38.

Turning now to FIG. 12, the tube is shown in its final stages of forming in the fin pass stands and welding cage. The welding apparatus includes a boom 39 extending within the partially formed tube from just before the fin pass stand 30 to the welding cage. Three welding wires 40–42 pass through the boom 39 to the welding region 43. Welding flux is also fed by air pressure to the welding area by apparatus 44. Welding circuit completion is provided by the apparatus 45.

A television camera 46, depicted in dashed line form, provides means for continuous monitoring of the welding as it is being accomplished in order to insure welding at the seam. Immediately upon detection of deviation of the welding heads from the seam, compensating adjustment can be made without loss of the entire tube in most cases.

The completely formed and internally welded tube, on emerging from the welding cage 36, is driven onto support rollers 47 of the roll-out station 14. When a sufficient amount of the formed tube is run out of the welding cage, the tack welds are cut, after which the tube is removed for final processing. At a station not shown, the tube seam is welded along its external surface to provide a finished tube ready for testing and use.

There is accordingly provided in the practice of the present invention method and apparatus for forming metal tubes in a continuous, in-line operation. Modification of the equipment to produce pipe of different diameter is accomplished by relatively simple adjustments of the mandrel forming rolls and welding cage.

Although only one embodiment of the present invention has been described and illustrated herein, many changes and modifications will, of course, suggest themselves to those skilled in the art. The described embodiment has been selected for this disclosure for the purposes of illustration only. The present invention should, therefore, not be limited to the embodiment so selected, the true scope of the invention being defined only in the appended claims.

I claim:

1. A method of forming a tube from an elongated flat metal sheet having a pair of side margins, comprising:

moving the sheet along a definite path generally coinciding with the sheet longitudinal axis while maintaining the sheet in a substantially horizontal condition;

engaging the side margins of the sheet upper surface with a plurality of forming rolls sequentially arranged along the sheet length to hold the sheet edges in substantially the same horizontal plane through tube formation;

progressively urging forming roll means against the lower surface of the sheet as it moves along the definite path, said roll means exerting a force on said sheet generally upwardly and outwardly to continuously form the sheet into a cylindrical cross-section of sequentially reducing diameter with the side edges thereof lying along a substantially straight line and in opposed condition at the undersurface of the so-formed tube; and welding the opposed edges of the so-formed tube along the inside of said tube.

2. A method of forming a tube as in claim 1, in which the opposed tube side edges are further welded along the outside of the tube.

3. A method of continuous forming of tubes from a plurality of elongate flat plates having leading, trailing and side edges, comprising:

moving the plates along a definite path generally coinciding with the plate longitudinal axis while maintaining said plates in a leading and trailing edge abutting series;

tack welding adjacent plates to one another at the abutting leading and trailing edges to form a continuous sheet;

progressively upwardly forming the central regions of the sheet into generally cylindrical cross-section of reducing diameter to bring the side edges into opposed relation at the underside of the so-formed tube while maintaining said side edges in the same substantially horizontal plane;

welding the opposed sheet side edges to one another along the tube inside;

separating the tack welds between adjacent plates; and welding the outside of the side edges of the already internally welded tube.

4. A method of forming a tube from an elongate flat plate, comprising:

continuously moving the plate along a definite path generally coinciding with the plate longitudinal axis through a forming mandrel progressively shaping said plate into a series of cylindrical cross-sections of reducing diameter to form a cylindrical tube with sheet side edges lying along a generally straight line on the tube lower surface, said edges being maintained in the same horizontal plane during shaping; and extending edge sealing means upwardly between the sheet edges and forwardly along the path of movement to seal the sheet side edges on the inside of the cylindrical tube in a continuous manner as it moves therepast.

5. A method of forming a tube from an elongated flat metal sheet having a pair of side margins, comprising:

maintaining the temperature of the sheet at ambient temperature;

moving the sheet along a definite path generally coinciding with the sheet longitudinal axis while maintaining the sheet in a substantially horizontal condition;

engaging the side margins of the sheet upper surface with a plurality of forming rolls sequentially arranged along the sheet length to hold the sheet edges in substantially the same horizontal plane throughout tube formation;

progressively urging forming roll means against the lower surface of the sheet as it moves along the definite path, said roll means exerting a force on said sheet generally upwardly and outwardly to continuously form the sheet into a cylindrical cross-section of sequentially reducing diameter with the side edges thereof lying along a substantially straight line and in opposed condition at the undersurface of the so-formed tube; and welding the opposed edges of the so-formed tube.

* * * * *